Jan. 5, 1954

F. WALLER 2,664,780

METHOD OF PHOTOGRAPHICALLY CORRECTING
THE PHOTOGRAPHIC IMAGES OF OBJECTS

Filed Feb. 4, 1948

Fred Waller
INVENTOR

BY Newton M. Purio
George A. Gillett Jr.
ATTORNEYS

Jan. 5, 1954

F. WALLER 2,664,780

METHOD OF PHOTOGRAPHICALLY CORRECTING
THE PHOTOGRAPHIC IMAGES OF OBJECTS

Filed Feb. 4, 1948

Fred Waller
INVENTOR

BY
ATTORNEYS

F. WALLER

2,664,780

METHOD OF PHOTOGRAPHICALLY CORRECTING THE PHOTOGRAPHIC IMAGES OF OBJECTS

Filed Feb. 4, 1948

Fred Waller
INVENTOR

BY Newton M. Perins
George A. Gillett Jr.
ATTORNEYS

Patented Jan. 5, 1954

2,664,780

UNITED STATES PATENT OFFICE 2,664,780

METHOD OF PHOTOGRAPHICALLY CORRECTING THE PHOTOGRAPHIC IMAGES OF OBJECTS

Fred Waller, Huntington Station, N. Y., assignor, by mesne assignments, to The Henry Booth Methods Corporation, New York, N. Y., a corporation of Delaware Application February 4, 1948, Serial No. 6,217

10 Claims. (Cl. 88—24)

The present invention relates to a method of tailoring in which the subject for whom an article of wearing apparel is to be made is photographed and the photographs are used for taking measurements for the construction of the wearing apparel.

While it is known that photography may be used for making measurements of an object or of a person, known methods and apparatus are not sufficiently complete or accurate enough to permit the procurement of all the required measurements or information. Furthermore, it has not before been commercially practical to obtain by means of a single photograph all the contours and dimensions necessary to make the patterns for a suit of clothes so that the perfect fit can be obtained without one or more try-ons.

The primary object of the present invention is the provision of a method of tailoring by which a single photograph of an object or person can be taken and from which can be made all the measurements necessary to determine the contour and size of the object or of a person.

Still another object of the invention is the provision of such a method in which correction can be made for improper positions of the object or person, each aspect of the object or person being printed individually in a position determined by observation of some other aspect of the object or person.

A still further object of the invention is the arrangement of a mirror system, in such a method of tailoring, for reflecting and directing three aspects of the object to a camera point or camera along optical paths, such that the three images of the object in the camera are all to the same scale.

Another object of the invention is the provision of objects of known size and dimension arranged to be photographed simultaneously with the object or person to be measured and located so as not to interfere with the positioning of the object.

A further object of the invention is the provision in one of such objects of known dimension of an opening so that a photograph can be made therethrough of the person or object simultaneously with a photograph of the object of known size.

Still another object of the invention is the procurement of a photograph having three laterally spaced images of lateral aspects of the object and having a fourth area above the laterally spaced areas for an image of the top of the object, all of said images having been made simultaneously in the studio of the invention or having been printed individually with corrections in the optical printer of the invention.

Other and further objects of the invention will be suggested to those skilled in the art from the description which follows.

In the illustrated embodiments of the invention like reference characters designate similar elements shown in the drawings which consist of the several views as follows.

The photograph of the object or person to be measured can be made in any suitable room but in commercial establishments and stores space is often limited and it is preferable to keep the space requirements to a minimum. For example, the room may be as shown having a floor 20, an end wall 21, side walls 22 and 23 and a ceiling 24.

The object or person is located in a predetermined position on an object support. According to the invention, the object support also constitutes one of the objects of known shape and size. Specifically, a flat circular disk 25 is placed on the floor 20 of the studio and carries a foot guide 26 for the feet of the person to be photographed. An in-seam measuring device comprises a vertical column 27 carrying a scale 28 and having an inverted L-shaped member 29 slidable in the vertical column 27 for engaging the crotch of the person to be measured in the manner well illustrated in Fig. 4.

The other object of known dimension is a flat circular ring 30 which is mounted from the ceiling 24 by a bracket 31. Disk 25 and ring 30 constitute a pair of symmetrically flat members of equal size and shape and are mounted on the floor and by the bracket 31, respectively, in parallel spaced relation, in axial alignment and congruent to each other so that the peripheries of said disk 25 and ring 30 define an imaginary right cylinder within which the object to be photographed is located by the foot guide 26. It will also be noted that the upper object of known dimension is provided with an opening, as in the circular ring 30, through which a photograph of the top view of the object or person may be taken simultaneously with a photograph of the object of known dimension or ring 30, see the top view in the photograph of Fig. 4.

The periphery of disk 25 is provided with a plurality of index marks 32 and the periphery of ring 30 is provided with a plurality of index marks 33. In each case said index marks 32 and 33 are in quadrature on the peripheries of their supports and are in the same angular position on each circular member so that opposite pairs of the index marks define mutually perpendicular vertical planes with their line of intersection at the center of the right cylinder defined by disk 25 and ring 30. Additional advantages of the particular form of the objects of known dimension and arrangement of the index marks thereon will appear subsequently.

The mirror system, according to the present invention, is constructed and arranged to reflect and direct simultaneously images of three aspects of the object at precisely the same scale and, preferably, also to reflect and direct a fourth or top view of the object or person to the camera point. For making measurements for wearing apparel it is desirable to have front, back, and profile views of the person, all at the same scale. This is accomplished, according to the invention, by providing a series of mirrors to direct an image of one lateral aspect of the person along a central path and onto the central portion of the camera frame and arranging two other series of mirrors to direct images of two different lateral aspects of the person along converging paths and onto separated portions of the camera frame on each side of the central image. In order that all three images of the different lateral aspects be at the same scale, it is necessary that the length of the central path be equal to the length of each converging path times the cosine of ½ the angle therebetween. Also, it should be pointed out that it is only possible to equalize the scale for each image of a lateral aspect by the use of mirrors to reflect images thereof and to adjust the length of the paths as above defined.

Specifically, mirrors 34 and 35 are mounted on the studio floor 20 adjacent the flat circular disk 25. A vertical relay mirror 36 directs the image from mirror 34 to the camera 37 which has a lens 38 and which is mounted upon a stand 39 or other suitable support. A vertical relay mirror 40 directs the reflected image from mirror 35 to the camera 37. The relay mirrors 36 and 40 are supported by a suitable frame 41. As best seen from Fig. 2, said mirrors 34 and 36 and mirrors 35 and 40 direct the images of the person or object along paths of equal length and which converge at the camera point or within the camera lens 38.

A mirror 42 is mounted at some distance from the object support and reflects an image of the opposite side of the object from that reflected from mirror 35 or of the front view according to the illustrated embodiment. A vertical relay mirror 43 is mounted on the frame 41 and reflects the image from mirror 42 into the camera lens 38. The object support, mirrors 34, 35, 36, 40, 42 and 43 and camera 37 are located so that the path from the center of the object and reflected by mirrors 42 and 43 is a central path and has a length equal to the length of either or both of the converging paths from the object and reflected by mirrors 34 and 36, and 35 and 40, respectively, to the camera lens 38 times the cosine of ½ of the angle between the central lines of the converging paths, such angle being indicated as $a$ in Fig. 2.

The overhead mirror 44 is mounted by bracket 31 over the ring 30 and reflects a top view of the object or person to an inclined relay mirror 45 mounted on the frame 41. The image of the top view of the object passes through the ring 30 and is reflected by mirrors 44 and 45 to the camera lens 38. However, the scale of the top view of a person or object will be determined by its height and hence measurements of length from such top view are not wholly reliable. Nevertheless, angular measurements, such as the amount that the object or person is twisted, can be made from such top view.

Figure 3:
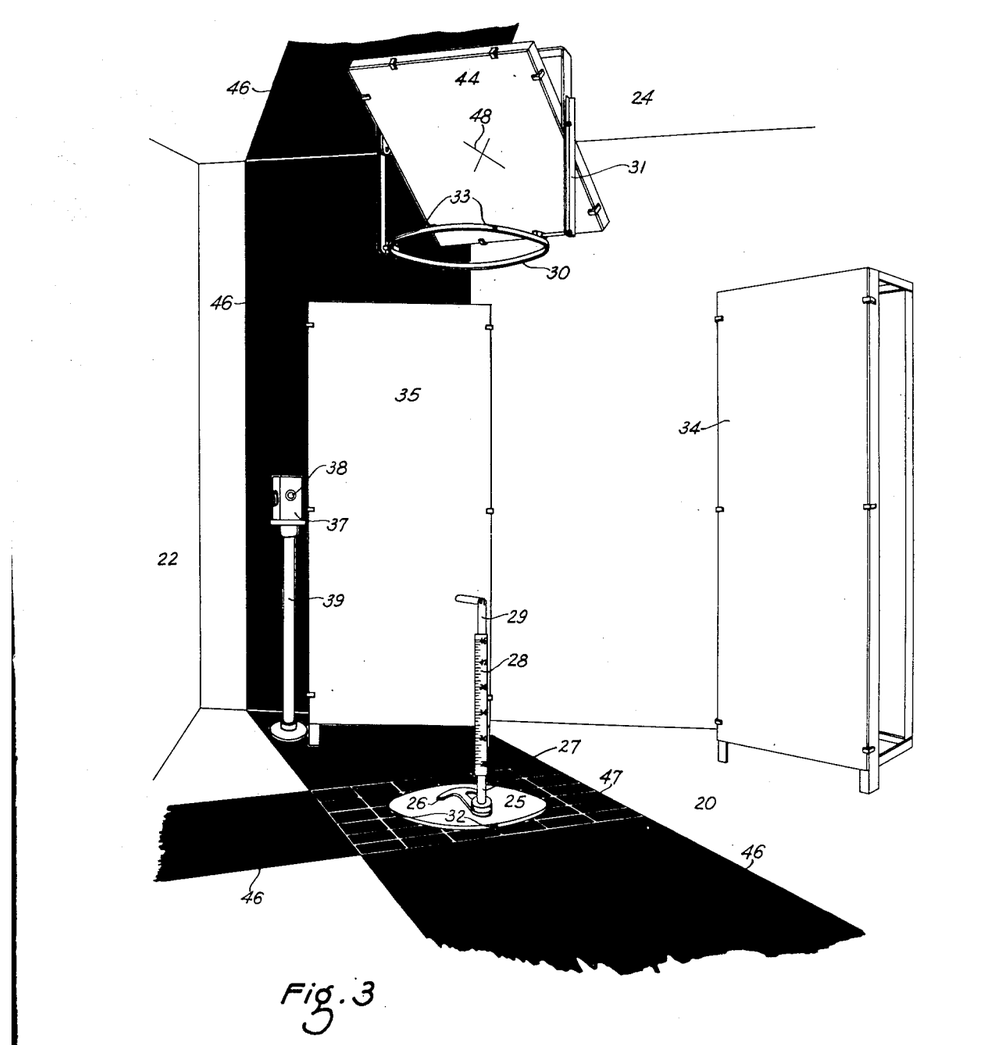
Fig. 3 is a fragmentary perspective view of one end of the studio, according to the invention, to enlarged scale and particularly showing the overhead object of known dimension and mirror.

Preferably, the floor, walls and ceiling of the studio are darkened or rendered light-absorbing within the field of view of any of the mirrors. This may be accomplished by dark stripes 46, best shown in Figs. 1 and 3. Also, such dark stripes provide a dark background in the positive photograph for the generally lighter person being photographed. In addition, the dark stripes also form a background for reference lines 47 which are parallel to the planes defined by opposite pairs of index marks 32 and 33. The advantage of such reference lines will also appear subsequently in connection with determination of the correction necessary on account of an abnormal twist of the person being photographed. A reference mark or cross 48 is placed on the overhead mirror 44 directly over the center of the cylinder defined by ring 30 and disk 25. Such reference mark will show on the top view, see Fig. 4, and indicates the amount that the person being photographed is tilted or is leaning to one side or the other.

Figures 2, 5, 6:
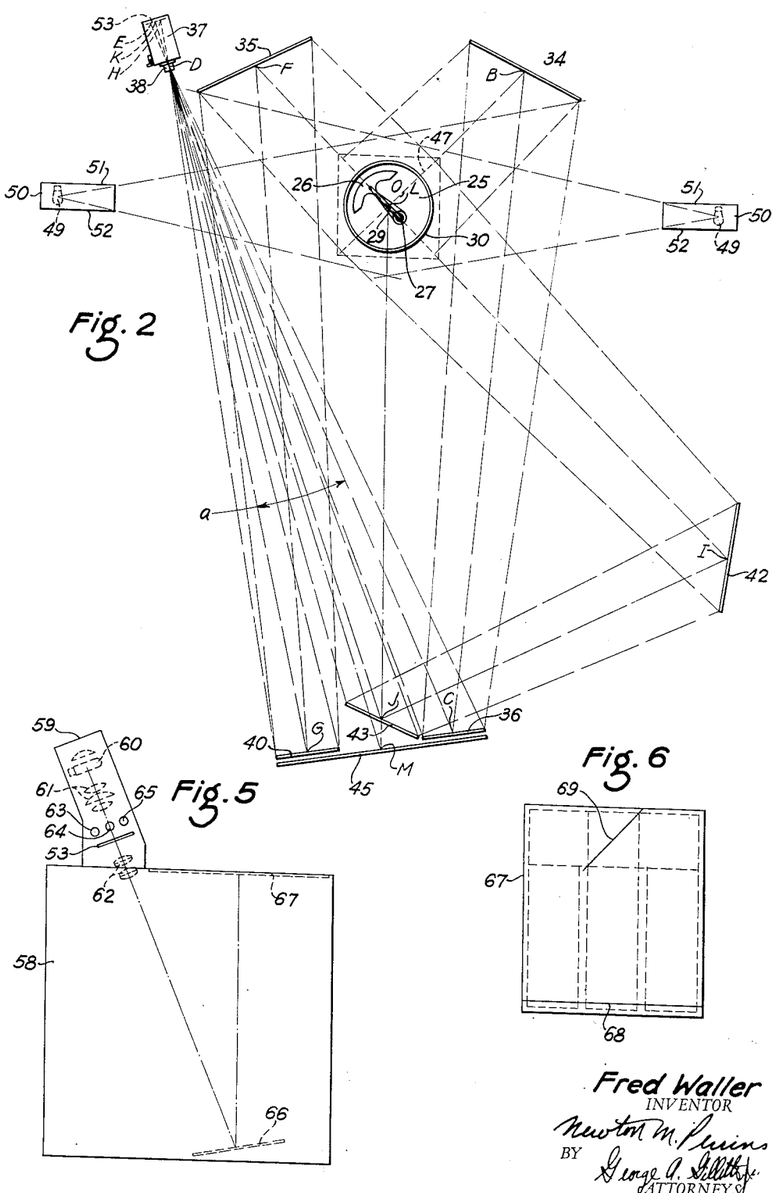
Fig. 2 is a plan view of the studio shown in Fig. 1 with construction lines representing the image paths from the object support to the camera and as reflected by the several mirrors.
Fig. 5 is a diagrammatic side elevation of a viewer for determining displacements of the images from their plane of interest or focal plane.
Fig. 6 is a plan view of the screen of the projector shown in Fig. 5.

An illuminating means is provided for artificial lighting of the object or person to be photographed. Preferably, such illuminating means is of the flash type so as to supply the required illumination with the least amount of discomfort to the person being photographed. According to the invention, such illumination means comprises a flash lamp 49 mounted within a reflector 50 which has parallel side walls 51 and 52 arranged and spaced to limit the beam from the flash lamp 49 so that direct rays do not strike any of the mirrors or the camera lens 38. As best shown in Fig. 2, the side walls of the reflector 50 limit the lateral spread of the beams from the flash lamps 49 so that direct rays do not reach either of the mirrors 34 or 35. Also, the reflectors 50 limit the vertical extent of the light beam so that no direct rays strike the overhead mirror 44. It should also be noted that the arrangement of the mirrors is such that the camera 37 may be located behind one of the mirrors to conceal more or less the camera from the person to be photographed and so that the mirror serves to shield the camera from any direct rays from the flash lighting means. This advantageous location of the camera is best shown in Fig. 2 and is deemed to be commercially important because the less conspicuous position of the camera has a beneficial psychological effect on the person to be photographed and because the additional shielding of the camera from direct light rays improves the quality of the photographs made. Such a studio and apparatus is also described and claimed in my copending application entitled Apparatus for Measuring an Object by Photography, Serial No. 118,928, filed September 30, 1949.

Figures 1, 4:
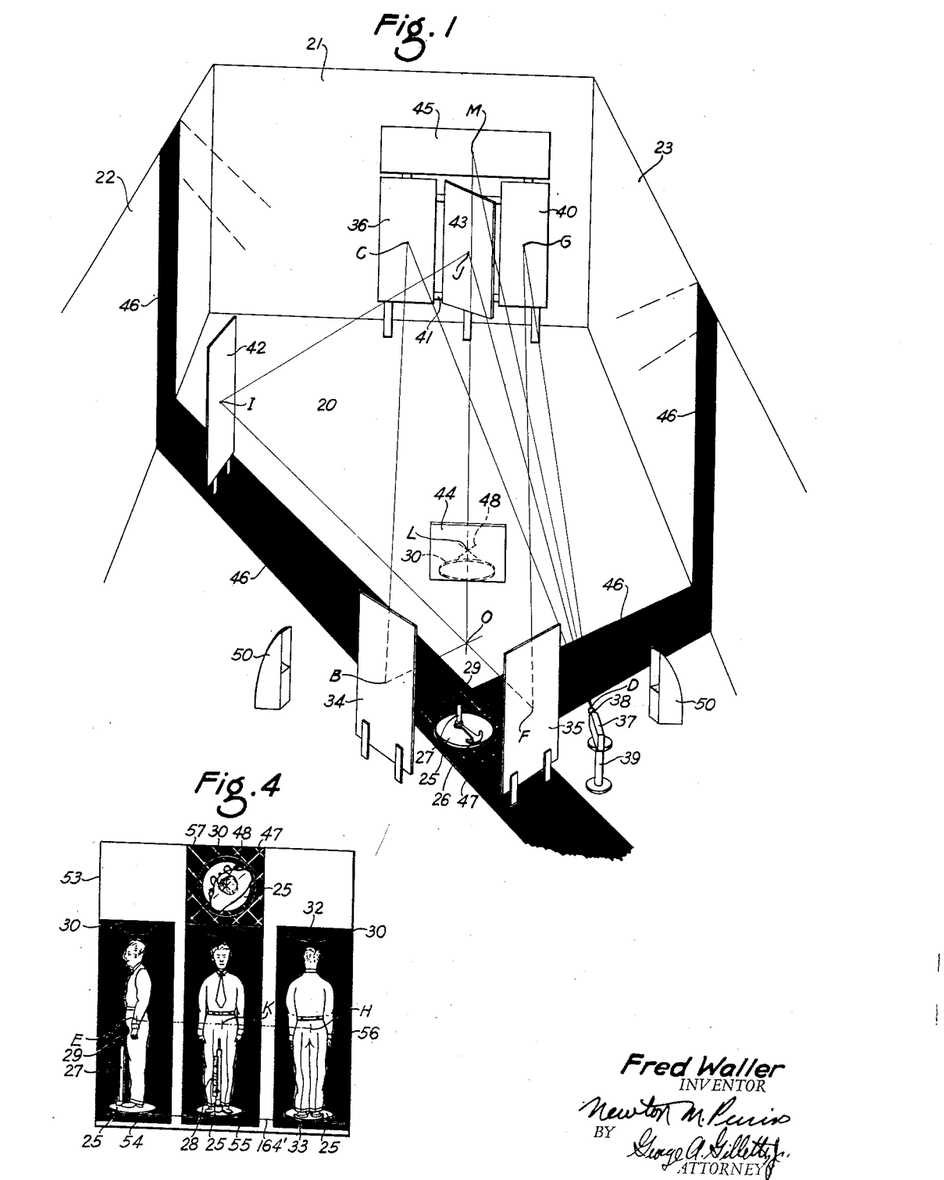
Fig. 1 is a perspective view of a studio, according to the invention, including an object support, a system of mirrors, illuminating means and a camera.
Fig. 4 is a plan view of a photograph made according to the invention and which has been or may be corrected, according to the method and apparatus disclosed herein.

The mirror and lighting systems described produce a photograph 53, such as shown in Fig. 4 and comprise profile, front, back and top views of the object or person on the object support. Such photograph has three laterally spaced image areas 54, 55 and 56 and a fourth area 57 above said laterally spaced image areas for a top view of the object or person. Such photograph 53, in addition to the respective images of the object or person, also contains images of the circular disk 25, of the ring 30, the index marks 32 and 33 thereon, of the in-seam measuring device and scale 28, a top view of the ring 30 with the reference cross 48 at the center thereof. Also, the top view shows the disk 25 within the circular ring 30. Such photograph provides a check upon the proper location of the objects of known dimensions, disk 25 and ring 30, and of any of the mirrors. For instance, if any one of the mirrors is inadvertently shifted, the size or alignment of the images of disk 25 and ring 30 will be altered to indicate immediately that correction is required in that particular studio. The photograph 53 may also include, in a known manner, a harness of measuring tapes on the person being photographed.

As shown in Figs. 1, 2 and 4, the central ray for the profile view is OBCD and it strikes a point E on the profile image area 54 of photograph 53. Likewise, the central ray for the rear view is OFGD and it strikes a point H on the rear view image area 56 of photograph 53. Said central rays for the profile and rear views therefore converge at an angle CDG. The central ray for the middle lateral view is OIJD and it strikes a point K on the image area 55 of photograph 53. Finally, the central ray for the top view is OLMD and it strikes the intersection of the reference cross 48 on the top image area 57 of photograph 53.

As already stated equalization of the scales for the images of lateral aspects of the objects requires that the length of the central rays for the center image shall be equal to the length of the central rays for the outer images times the cosine of ½ the angle between the converging central rays. But such statement of the relationship assumes that both central rays for the outer images are of the same length and that the central ray for the center image bisects the angle between said central rays for the outer images.

The present invention, however, contemplates equalization of image scales under other conditions, such as unequal lengths of the central rays for the outer images and/or unequal angles between the central ray for the center image and the central rays for the outer images. Also, since the forward conjugate of lens 38 coincides with the central ray for the center image, the relationship for equalizing of image scales is better stated as a function of such central ray OIJD as follows:

$$OBCD = \frac{OIJD}{\cos \angle CDJ} = \frac{KD}{\cos \angle KDE} \times \text{magnification}$$

$$OFGD = \frac{OIJD}{\cos \angle GDJ} = \frac{HD}{\cos \angle HDK} \times \text{magnification}$$

Alternatively such relationships may be stated as a function of the angle between adjacent central rays, as follows:

$$\tan^{-1} \frac{\text{Image center distance}}{\text{rear conjugate lens 38}} = \tan^{-1} \frac{KH \text{ or } KE}{DK}$$

The photograph 53 may now be placed in a viewer or projector 58 having a lamphouse 59 containing a conventional light source 60, condenser lenses 61, objective lenses 62 and vertical, lateral and rotatable adjustments for the photograph 53 obtained in a known manner respectively by the knobs 63, 64 and 65. The image beam in projector 58 is reflected by a mirror 66 onto a screen 67. Preferably, the screen 67 is etched or otherwise provided with a horizontal reference line 68 and a diagonal reference line 69.

By means of such a projector it is possible to observe the displacement of any of the images of lateral aspects of the object with respect to each other, the amount that the object is twisted, tilted or leans to one side or the other. Any such displacement of the person from the mutually perpendicular planes defined by the index marks 32 and 33 or from the line of their intersection indicated by reference cross 48 results in changing the scale of the image because the scales of the images are exactly equal only along lines measured in the focal or reference planes defined by the reference marks. Since it is not possible to always position a person to be photographed with such reference planes precisely intersecting the profile and broadside view of the person and since for tailoring purposes it is preferable to have the person assume a natural position, it sometimes is necessary to correct the images on the photograph 53 before taking the measurements to be used in making the wearing apparel. For this purpose, the projector 58 can be used to determine from the image area 57 the amount that the person is tilted with respect to the vertical plane defined by the reference marks 32 and 33 in image area 54 or from the intersection of the reference planes defined by the reference cross 48 in image area 57. Similarly, by observation of image areas 55 and/or 57 the amount that the person is leaning to one side or the other can be ascertained by comparison of the person's image with the reference marks 32 and 33 in image area 55 and with reference cross 48 in image area 57, If desired, the amount of such leaning to one side or the other can be verified by comparison of the person's image with the reference marks 32 and 33 in image area 56. Finally, observation of the top view of the person in image area 57 permits determination of the amount that the person is twisted and for this purpose comparison is made with the diagonal reference line 69 and with the images of the diagonal lines 47 on the floor of the studio. While it is preferable to make the checks on mirror positions and on positions of disk 25 and ring 30 in the projector 58, it will be apparent that such check and the determinations of displacements of the person can be made directly on the photographic negative or in the optical printer next to be described and which is claimed in my copending application entitled Photographic Apparatus for Correcting a Negative During Printing Thereof, Serial No. 118,927, filed September 30, 1949.

The optical correction of the photographic images obtained constitutes an important refinement in the method and apparatus of measuring objects by photography and particularly for a method and apparatus providing photographs to be measured for the making of wearing apparel for people. Such optical correction is advantageously accomplished in an optical printer comprising generally an illuminating and optical system, a negative holder, an objective lens, and a sensitized material holder. The aforementioned parts of the optical printer, according to the invention, are mounted upon a base plate 70.

Figure 7:
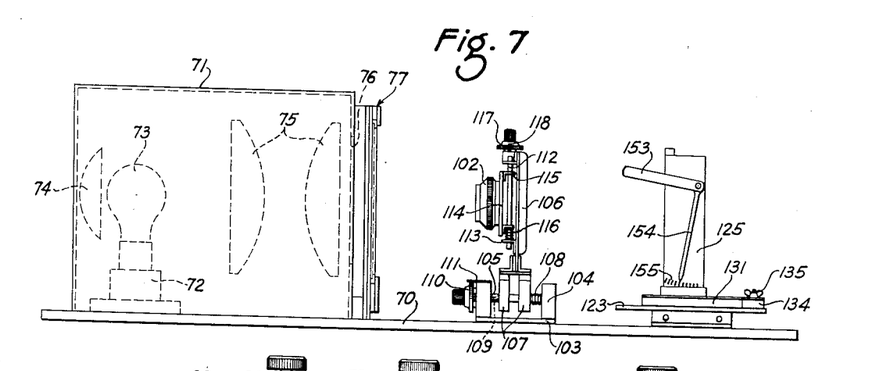
Fig. 7 is a side elevation of an optical printer, according to the invention.

A lamphouse 71 on base plate 70 contains a lamp receptacle 72, a lamp 73, a reflector 74 and a pair of condenser lenses 75. One end of the lamphouse 71 is provided with an opening 76 through which a beam of light is projected.

Figure 8:
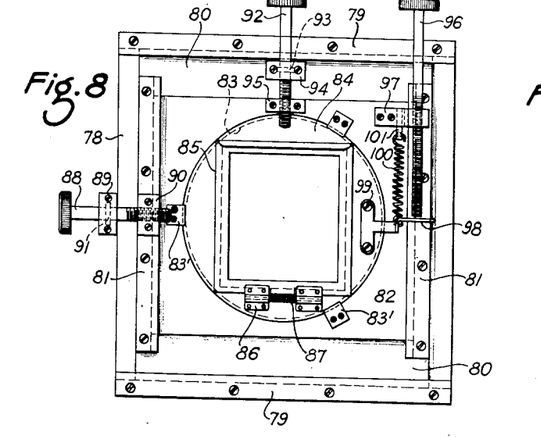
Fig. 8 is a front view and Fig. 9 is a side view of the negative holder of the optical printer.
Figure 9:
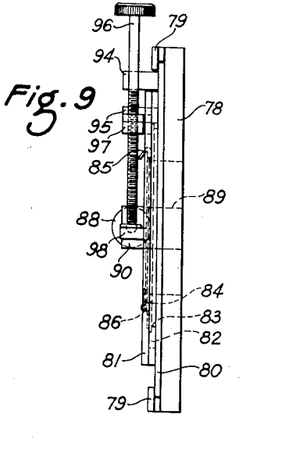

A negative holder indicated generally as 77 is positioned to support a photographic transparency in registry with opening 76. Specifically, a base plate 78 is attached to the open end of lamphouse 71 and a pair of spaced horizontal guideways 79 are fastened to base plate 78. A laterally movable plate 80 is mounted with its upper and lower edges in guideways 79 and in turn carries a pair of vertical guideways 81. A vertically movable plate 82 has its side edges engaging guideways 81 and is provided with a circular counter-bored opening 83. A rotary mounting plate 84 is mounted for rotation within said opening 83, is held therein by a plurality of lugs 83', and carries a negative frame 85 mounted thereon by hinges 86 and spring pressed thereagainst by a coil spring 87. Thus, the negative or photograph 53 can be mounted on plate 84 merely by opening the frame 85, inserting the negative and releasing the frame 85 for spring pressure against the negative or transparency.

Horizontal, vertical and rotary adjustments are preferably provided for the negative holder. Horizontal adjustment is obtained by means of a thumbscrew 88 rotatably supported in a journal block 89 on base plate 78 and threaded into a screw block 90 on plate 80 over one of the vertical guideways 81. A flange 91 on thumbscrew 88 prevents axial movement of the thumbscrew with respect to journal block 89 and so that rotation of thumbscrew 88 moves the laterally movable plate 80 to one side or the other, as viewed from Fig. 8. A second thumbscrew 92 has a flange 93 rotatably mounted in a journal block 94 on plate 80 and engages a screw block 95 on the vertically movable plate 82. Thus, rotation of thumbscrew 92 will raise or lower the negative holder, as viewed from Fig. 8.

Another thumbscrew 96 is threaded through a screw block 97 on plate 82 and has its end engaging against the end of a tongue member 98 which is mounted by screws 99 upon the rotary mounting plate 84. A coil spring 100 has one end attached to tongue member 98 and the other member attached to a post 101 on screw block 97. As a result, the rotary mounting plate 84 is normally pressed against the end of the thumbscrew 96 which is rotated in one direction or the other to rotate the mounting plate 84 and the photographic transparency thereon in one direction or the other.

The objective lens 102 is mounted for vertical and longitudinal movement in any suitable manner, such as that shown in Fig. 7. Specifically, a base member 103 has a pair of spaced members 104 between which a pair of rods 105 extend. A carriage frame 106 includes a pair of spaced blocks 107 mounted to slide on said rods 105. Coil springs 108 encircle rods 105 and normally urge the carriage frame 106 and blocks 107 against the end of a rod 109 which is threaded through one of end members 104 and which has a graduated knob 110 moving with respect to a pointer 111 on end member 104. Rotation of knob 110 will, therefore, cause movement of the carriage frame 106 and objective lens 102 longitudinally of the optical printer as shown in Fig. 7. A pair of vertical rods 112 are mounted between brackets 113 on carriage frame 106 and an objective mount 114 has perforated ears 115 slidable on said rods 112. Coil springs 116 encircle rods 112 and urge the objective mount 114 and objective lens 102 therein upwardly and against the end of a threaded rod (not shown) which bears against the upper surface of objective mount 114, which is threaded through carriage frame 106 and which is operated by a graduated knob 117. An index member 118 permits observation of the adjustment of knob 117 or its return to a known position.

Figure 10:
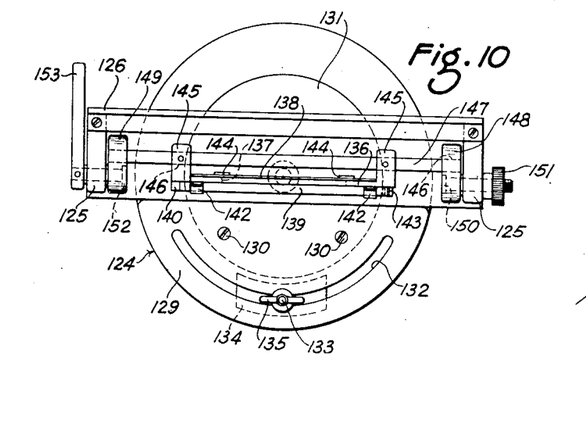
Fig. 10 is a top view and Fig. 11 is an elevation of the holder for the sensitized material to be printed, according to the method and apparatus of the invention.
Figures 11, 12, 13, 14:
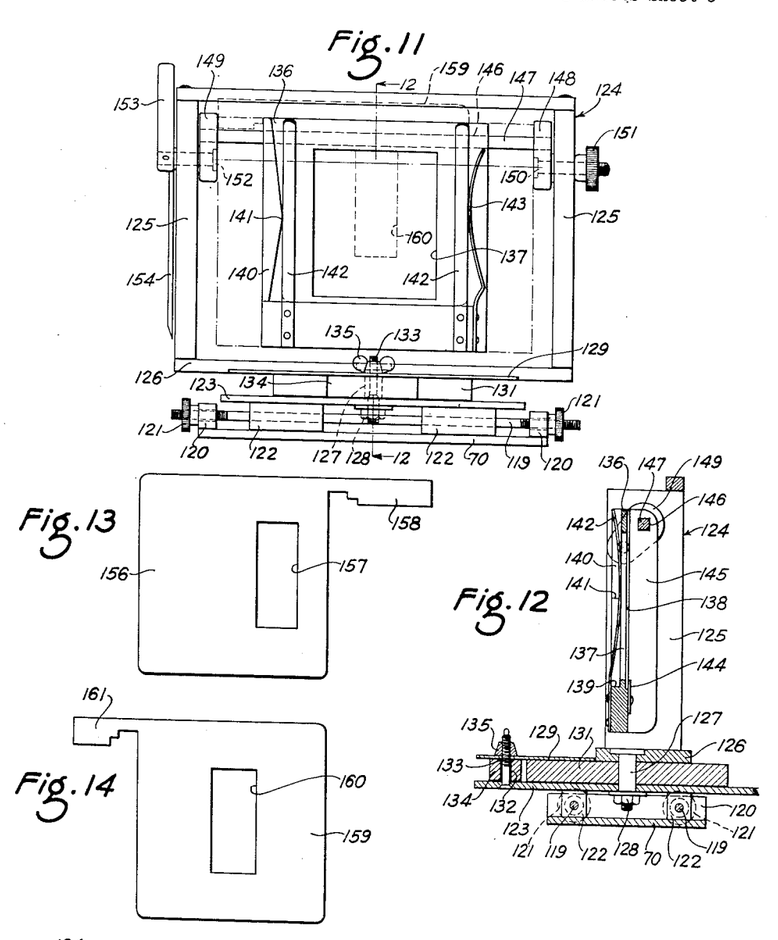
Fig. 12 is a vertical cross section of the holder for the sensitized material taken on the line 12—12 of Fig. 11.
Figs. 13, 14 and 15 are elevations of masks alternately to be placed in the holder for the sensitive material.

The holder and mounting means for the light-sensitive material to be exposed or printed makes it possible to adjust such material with respect to the negative in three senses, namely, transversely, vertically and rotatably to tilt the material with respect to the negative. The specific means for obtaining such adjustments can be provided in several ways but one convenient arrangement of such adjustments is illustrated in Figs. 10, 11 and 12. One lateral adjustment for such a holder is accomplished by a pair of threaded rods 119 extending at each end through a pair of side rails 120 on base 70 and carrying thumb nuts 121. A pair of blocks 122 are mounted in spaced relation on each of threaded rods 119 and are fastened to a circular support plate 123. A rectangular supporting frame 124 comprises side arms 125 and a bottom member 126 which is fastened by a headed stud 127 and nut 128 to support plate 123 for rotation thereon. A semi-circular guide plate 129 is fastened by screws 130 to an intermediate turntable 131 and is provided with an arcuate slot 132. A threaded bolt 133 extends upwardly through supporting plate 123, a spacing block 134 and slot 132 for engagement by a winged nut 135. By means of the adjustments described, it is possible to displace the supporting frame 124 transversely of the base plate 70 and also to rotate the supporting frame 124 about a vertical axis through the headed stud 127. The lateral adjustment accomplished by adjustment of the thumb nuts 121 will permit aligning of the vertical axis of rotation with the optical axis of the objective lens 102 and loosening of wing nut 135 will permit rotation of the supporting frame around such vertical axis to bring the plate into parallelism with the negative or transparency in the negative holder.

The plate holder proper comprises a frame 136 provided with an exposure opening 137 and a mask guideway 138. Said frame 136 has a bottom ledge 139 and a lateral shoulder 140 with a central peak 141. A pair of leaf springs 142 are mounted on ledge 139 and extend upwardly to press a sheet of sensitive material against the frame 136. Another leaf spring 143 is mounted on the end of bottom ledge 139 for engaging the edge of a sensitized plate to urge its other edge against the peak 141 of lateral shoulder 140. A pair of clips 144 are mounted on frame 136 to engage the lower edge of a mask to be later described, and which may be inserted in the mask guideway 138.

Frame 136 also includes a pair of laterally spaced side members 145 which are each provided with square apertures 146. A square rod 147 extends through said apertures 146 and has its ends respectively mounted in crank members 148 and 149. Crank member 148 is operatively connected to side arm 125 by a headed stud 150 and thumb nut 151. Crank arm 149 is rotatably mounted on the other side arm 125 by means of a headed stud 152 carrying on its outer end a handle 153 and a pointer 154 movable over a scale 155 on the outer face of side arm 125. As a result, the frame 136 can be moved laterally on rod 147 to center any of the laterally spaced image areas of the photograph over the vertical axis through headed stud 127. Furthermore, upon loosening of thumb nut 151 the frame 136 can be tilted to a position which has been predetermined and which is indicated by the pointer 154, whereupon thumb nut 151 is tightened and such tilted position is maintained. It should be noted that headed studs 150 and 152 are in axial alignment and that the axis of tilting for frame 136 substantially coincides with the foot line of a photograph or a horizontal line contacting the images of disks 25 at the reference marks 32 in each of the images of the lateral aspects of the object or person.

Figure 15:
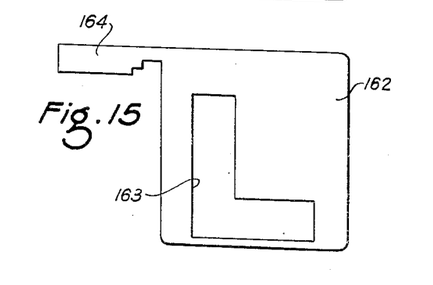

Each of the images of lateral aspects of the object are printed individually so that a different correction can be made during each printing step. For this purpose, a series of masks are provided for insertion into the guideway 138. One such mask 156, see Fig. 13, is provided with a rectangular opening 157 so that the image of the view at one side of the photograph or transparency 53 can be printed. A projection 58 extends laterally from the upper edge of mask 156 and is arranged so that the mask can not be completely inserted into the guideway 138 until the frame 136 has been moved laterally on rod 147 to bring the vertical center line of opening 157 into coincidence with the vertical axis through the headed stud 127. A second mask 159 is provided with a central vertical opening 160 and has a lateral projection 161, see Fig. 14. As before, the projection 161 prevents the insertion of mask 159 completely into the guideway 138 until the same has been centered so that the vertical center line 160 coincides with the vertical axis of headed stud 127. Finally, mask 162, see Fig. 15, is provided with an L-shaped opening 163 and has a projection 164. Said projection 164 prevents complete insertion of said mask 162 until the vertical portion of the opening 163 has its center line over the vertical axis of headed stud 127. The horizontal portion of opening 163 permits the printing of the top view simultaneously with one of the lateral views because a corrected image of the top view is seldom required.

The method of operation of the optical printer just described will next be explained. The fundamental principle embodied in practicing the method of the invention is that the position of each aspect of the object is corrected during printing by an amount determined by inspection or measurement of an image of some other aspect of the object or person. Such correction is accomplished by orientation including lateral adjustment, vertical adjustment, rotation or tilting of the sensitized material with respect to the photographic transparency in the negative holder. While it is possible to make corrections for vertical or lateral displacement of the image and/or tilting, twisting or leaning of the person photographed, it often happens that only one or two of such corrections need be made.

For example, the photograph 53, for some reason, such as a slight displacement of a mirror, may have one of the images of a lateral aspect above the foot line 164. This vertical displacement could be determined by laying a straight edge across the negative or by observation with respect to the horizontal reference line 68 when the negative is viewed in the projector 55. Correction of such vertical displacement would be accomplished in the optical printer, when that image of the lateral aspect is being printed, by adjusting the thumbscrew 92 on the negative holder to bring the image of the reference mark 32 onto the same horizontal line with the other images. Such an adjustment can be facilitated by the insertion of a clear glass plate with a horizontal etched line thereon into the frame 136. Likewise, lateral shifting of the image of a lateral aspect of the person can be accomplished by adjustment of the thumbscrew 88 on the negative holder. Finally, angular displacement of any image can be corrected in the optical printer by adjustment of the thumbscrew 96. Such adjustments are primarily for correction of inadvertent displacements of the mirrors or objects of known dimension in the studio.

The adjustments of the objective lens 102 are seldom necessary once the longitudinal adjustment has been set for proper ratio of the negative and positive image sizes which should be one-to-one. The adjustment of graduated knob 117 merely raises or lowers the lens 102 for proper centering of the lens with respect to the transparency.

Also, the lateral adjustment of the sensitive material holder by means of thumb nuts 121 need not be changed once the vertical axis through the headed stud 127 has been moved to intersect the optical axis through objective lens 102. The other adjustments of the sensitive material holder are for the purpose of correcting the position of the object or person photographed. The person being photographed as previously mentioned, may be tilted forwardly or rearwardly of the plane defined by one set of opposite pairs of the index marks 32 and 33. The amount of such tilting can best be determined from the profile view but may also be determined by the amount that the estimated center of the person's head is displaced from the reference cross 49. Inasmuch as an angular determination of the amount of tilting is required to set the frame 136 at a corresponding angle of tilting, the determination of this correction is preferably made from the profile view. Assume a forward tilt in the profile view of 10°, which is not unusual in actual practice. When mask 159 is in place for printing of the front view of the person, the handle 153 is rotated through the angle determined by inspection, in this case 10°, of the profile view and the exposure of the sensitive material is made. The result of such exposure is in effect to obtain an image of the person as though a position were taken with the plane of interest of the person coinciding with the plane defined by the index marks 32 and 33. The same correction may be made with an opposite angle of tilting, such as an angle of 10° in the other direction and exposure of the area for printing the back view.

Assume now that the person is twisted during photographing, some 15° as determined by inspection of the top view. As before, the amount of twist can be measured directly on the negative or with respect to the diagonal reference line 69 on the screen 67 or projector 58. Such correction is applied during printing of the front and rear views of the person by loosening the wing nut 135 and swinging the supporting frame 124 around a vertical axis through an angle of 15° or angle corresponding to the amount of the twist found from the top view of the person photographed. As before, the projections on the masks will not permit the printing of the front and back views until the area to be printed is centered over the vertical axis of rotation of supporting frame 124. While not generally necessary, it is within the scope of the invention that two corrections may be applied simultaneously to a single view. For example, the frame 136 may be tilted through a determined angle to correct for tilting of the person and may be rotated around a vertical axis to correct the twist of the person at the same time and the printed image will be corrected in two respects. Also, at this point it is noted that the least likely point of displacement is the foot line and all tilting corrections are made around such line as an axis. For this reason, the axis of rotation through headed studs 150 and 152 substantially coincides with the foot line for the view being corrected and which is generally common to all of the lateral views being printed.

After printing of the sensitive material or plate, according to the method and in the apparatus just described, the sensitive material is processed by known photographic methods to develop the latent image thereon. Generally and preferably, a positive image is obtained at this point with dark backgrounds on account of the dark stripes 46 on the studio floor, walls and ceiling. The image of the person to be photographed will generally be light, providing good contrast to the background for measurement of outlines. Such contrast is of peculiar advantage in the present system and because true measurements are taken only along those portions of the image which are in the planes defined by the reference marks 32 and 33.

Figures 16, 17:
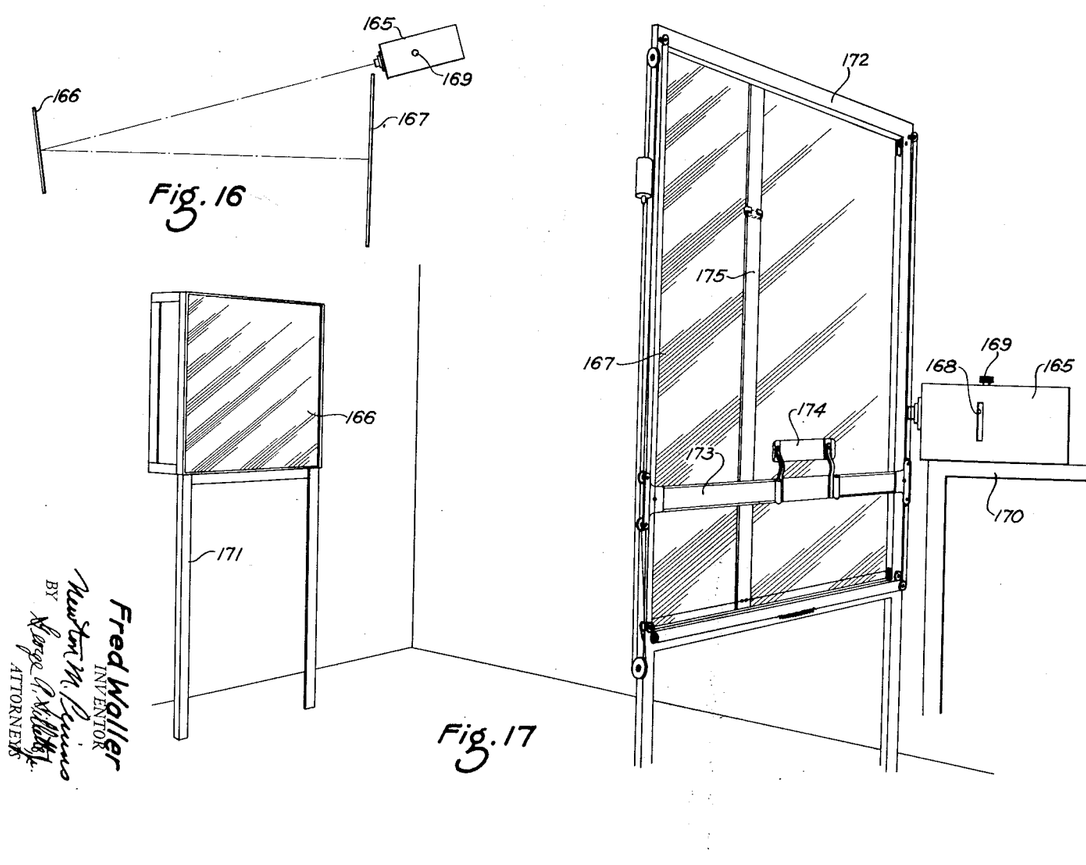
Fig. 16 is a diagrammatic view of a projector, mirror and screen used to project an enlarged image of the corrected photograph for making measurements therefrom.
Fig. 17 is a perspective view of such projector and screen and illustrating the arrangement of straight edges which will facilitate making of the necessary measurements.

The final step in the use of the photographs or positive pictures made as previously described is to project the several images of the various aspects of the object or person to an enlarged and known scale for obtaining the necessary measurements. For this purpose, a projection system may be used consisting generally of a projector 165, a mirror 166 and a translucent screen 167 arranged as diagrammatically illustrated by Fig. 16. The advantage of reflecting the image to the screen is that the projector is next to the screen and the entire system can be readily and easily used by one person. The projector 165 may be of conventional design provided with an opening 168 for insertion of the transparencies and having a knob 169 for framing, adjustment or movement of the transparency. The projector is preferably mounted on a waist-height support 170 and the mirror 166 is supported some distance above the floor by a frame 171. The screen 167 is mounted at a convenient distance above the floor by a frame-work 172. A horizontal straight edge 173 carrying a laterally slidable supplementary straight edge 174 is mounted by a system of cords, pulleys and counter-weights for movement vertically with respect to the screen 167. A vertical straight edge 175 is mounted for lateral movement on the frame-work 172 and is also controlled by cords and pulleys for parallel movement. The cords and pulley systems preferred are similar to those commonly used for straight edges on drafting boards.

Since many variations of the method disclosed herein are possible, the present disclosure is merely illustrative. The scope of the invention is defined by the claims which follow.

Having now particularly described my invention, what I desire to secure by Letters Patent of the United States and what I claim is:

1. In the method of tailoring in which the subject for whom a garment is to be made is photographed and the photographs are used for taking measurements for the construction of the garment; the improvement which comprises arranging at least two pairs of mirrors with respect to a camera and to the subject to be photographed so that images of at least two aspects of the subject, as viewed from vertical and mutually perpendicular planes intersecting said subjects, will be twice reflected each along respective bent optical paths of equal length to said camera, photographing simultaneously said images with said camera to obtain photographic images of said reflected aspects at the same scale with respect to said vertical planes, correcting the photographic images of said aspects of the subject with respect to said vertical and mutually perpendicular planes by measuring in the plane of the image of one aspect about the point of intersection of said vertical planes and the supporting plane for said object the angular displacement of the vertical center line of said one aspect from the other of said vertical planes, displacing angularly a plane light-sensitive material from a normal position about a horizontal line corresponding to said supporting plane to the same extent and in the same direction as the measured angular displacement between the image of said one aspect and the other vertical plane to effectively position the image of said other aspect in its respective vertical plane, and printing the images by projection onto said light-sensitive material while the light-sensitive material is so displaced, to produce the photographs from which the measurements are taken.

2. In the method of tailoring in which the subject for whom a garment is to be made is photographed and the photographs are used for taking measurements for the construction of the garment; the improvement which comprises arranging at least two pairs of mirrors with respect to a camera and to the subject to be photographed so that images of at least two aspects of the subject, as viewed from vertical and mutually perpendicular planes intersecting said subject, will be twice reflected each along respective bent optical paths of equal length to said camera, photographing simultaneously said images with said camera to obtain photographic images of said reflected aspects at the same scale with respect to said vertical planes, correcting the photographic images of said aspects of the subject with respect to said vertical and mutually perpendicular planes by measuring in the plane of each aspect about the point of intersection of said vertical planes and the supporting plane for said subject the angular displacement of the vertical center line of each aspect from the other of said vertical planes, displacing angularly a plane light-sensitive material from a normal position about a horizontal line corresponding to said supporting plane to the same extent and in the same direction as the measured angular displacement between the image of one aspect and the other aspect in its respective vertical plane, and printing the images by projection onto said light-sensitive material while the light-sensitive material is so displaced so that in the printed photograph the center line of each aspect coincides with the intersection line of said vertical planes, to produce the photographs from which the measurements are taken.

3. In the method of tailoring in which the subject for whom a garment is to be made is photographed and the photographs are used for taking measurements for the construction of the garment; the improvement which comprises arranging at least two pairs of mirrors with respect to a camera and to the subject to be photographed so that images of at least two aspects of the subject, as viewed from vertical and mutually perpendicular planes intersecting said subject with the images of the subject arranged along a common base line, will be twice reflected each along respective bent optical paths of equal length to said camera, photographing simultaneously said images with said camera to obtain photographic images of said reflected aspects at the same scale with respect to said vertical planes, correcting the photographic images of said aspects of the subject with respect to said vertical and mutually perpendicular planes by measuring in the plane of the image of one aspect about the point of intersection of the intersection line of said vertical planes and said common base line the angular displacement of the center line of said one aspect from the other of said vertical planes, and displacing angularly a plane light-sensitive material from a normal position about a horizontal axis coincident with the projected image of said common base line to the same extent and in the same direction as the measured angular displacement between the image of said one aspect and the other vertical plane to effectively position the image of said other aspect in its respective vertical plane, and printing the images by projection onto said light-sensitive material while the light-sensitive material is so displaced to produce the photographs from which the measurements are taken.

4. In the method of tailoring in which the subject for whom a garment is to be made is photographed and the photographs are used for taking measurements for the construction of the garment; the improvement which comprises arranging at least two pairs of mirrors with respect to a camera and to the subject to be photographed so that images of at least the profile and broadside of the subject will, as viewed from vertical and mutually perpendicular planes intersecting said subject with said images arranged along a common base line, be twice reflected each along respective bent optical paths of equal length to said camera, photographing simultaneously said images with said camera to obtain photographic images of said profile and broadside of the subject at the same scale, correcting the photographic images of said aspects of the subject with respect to said vertical and mutually perpendicular planes by measuring in the plane of the image of said profile view about the point of intersection of the intersection line of said vertical planes and said common base line the angular displacement of the vertical center line of said profile view from the other of said vertical planes, displacing angularly a plane light-sensitive material from a normal position about a horizontal axis coincident with the projected image of said common base line to the same extent and in the same direction as the measured angular displacement between the image of said profile view and the other vertical plane to effectively position the image of said broadside view in its respective vertical plane, and printing the images by projection onto said light-sensitive material while the light-sensitive material is so displaced to produce photographs from which the measurements are taken.

5. In the method of tailoring in which the subject for whom a garment is to be made is photographed and the photographs are used for taking measurements for the construction of the garment; the improvement which comprises arranging at least two pairs of mirrors with respect to a camera and to the subject to be photographed so that images of at least the profile and broadside of the subject will, as viewed from vertical and mutually perpendicular planes intersecting said subject with said images arranged along a common base line, be twice reflected each along respective bent optical paths of equal length to said camera, photographing simultaneously said images with said camera to obtain photographic images of said profile and broadside of the subject at the same scale, correcting the photographic images of said aspects of the subject with respect to said vertical and mutually perpendicular planes by measuring in the plane of the image of said broadside view about the point of intersection of the intersection line of said vertical planes and said common base line the angular displacement of the vertical center line of said broadside view from the other of said vertical planes, displacing angularly a plane light-sensitive material from a normal position about a horizontal axis coincident with the projected image of said common base line to the same extent and in the same direction as the measured angular displacement between the image of said broadside view and the other vertical plane to effectively position the image of said profile view in its respective vertical plane, and printing the images by projection onto said light-sensitive material while the light-sensitive material is so displaced to produce photographs from which the measurements are taken.

6. In the method of tailoring in which the subject for whom a garment is to be made is photographed and the photographs are used for taking measurements for the construction of the garment; the improvement which comprises arranging at least two pairs of mirrors with respect to a camera and to the subject to be photographed so that images of at least the profile and top of the subject will, as viewed from vertical and mutually perpendicular planes intersecting said subject with said images arranged along a common base line, be twice reflected each along respective bent optical paths of equal length to said camera, photographing simultaneously said images with said camera to obtain photographic images of said profile and top of the subject at the same scale, correcting the photographic images of said aspects of the subject with respect to said vertical and mutually perpendicular planes by measuring in the plane of the image of said top view with respect to the center of said object and the plane of interest of the profile view to obtain the angular displacement with respect to said base line of the center line of said profile view from said plane of interest, displacing angularly a plane light-sensitive material from a normal position about a horizontal axis coincident with the projected image of said common base line to the same extent and in the same direction as the measured angular displacement of the center line of the image of said profile view to effectively position the image of said profile view in its respective vertical plane, and printing the images by projection onto said light-sensitive material while the light-sensitive material is so displaced to produce photographs from which the measurements are taken.

7. In the method of tailoring in which the subject for whom a garment is to be made is photographed and the photographs are used for taking measurements for the construction of the garment; the improvement which comprises arranging at least two pairs of mirrors with respect to a camera and to the subject to be photographed so that images of at least the broadside and top of the subject will, as viewed from vertical and mutually perpendicular planes intersecting said subject with said images arranged along a common base line, be twice reflected each along respective bent optical paths of equal length to said camera, photographing simultaneously said images with said camera to obtain photographic images of said broadside and top of the subject at the same scale, correcting the photographic images of said aspects of the subject with respect to said vertical and mutually perpendicular planes by measuring in the plane of the image of said top view with respect to the center of said object and the plane of interest of the broadside view to obtain the angular displacement with respect to said base line of the center line of said broadside view from said plane of interest, displacing angularly a plane light-sensitive material from a normal position about a horizontal axis coincident with the projected image of said common base line to the same extent and in the same direction as the measured angular displacement of the center line of the image of said broadside view to effectively position the image of said broadside view in its respective vertical plane, and printing the images by projection onto said light-sensitive material while the light-sensitive material is so displaced to produce photographs from which the measurements are taken.

8. In the method of tailoring in which the subject for whom a garment is to be made is photographed and the photographs are used for taking measurements for the construction of the garment; the improvement which comprises positioning the subject to be photographed with respect to indicia marks defining a common base line and vertical and mutually perpendicular planes of interest, said indicia marks intersecting said subject, when so positioned, throughout its height, locating a camera so that images of the top and profile of the subject may simultaneously be reflected thereto, twice and simultaneously reflecting the top and profile views of the subject along respective bent optical paths of equal length to said camera, simultaneously photographing with said camera said twice reflected top and profile views to obtain corresponding images at precisely the same scale and with respect to said vertical planes and the intersection line thereof and said base line, measuring in the plane of the image of said top view with respect to the center of said object and the plane of interest of said profile view to obtain any angular displacement with respect to the center of said subject and the plane of interest of said profile view to obtain any angular displacement with respect to said base line of the center line of said profile view from said plane of interest and with respect to the point of intersection of said planes to obtain the angular displacement of the plane of said profile view from the plane of interest of said profile view, and displacing angularly a plane light-sensitive material from a normal position about a horizontal axis coincident with the projected image of said base line to the same extent and in the same direction as the angular displacement of the center line of the image of said profile view from said plane of interest of said profile view and about a vertical axis coincident with the vertical intersection line of said planes of interest to the same extent and in the same direction as the angular displacement of the plane of said profile view from the plane of interest of said profile view to effectively position the image of said profile view in its respective plane of interest and centrally of said vertical intersection line, and printing the images by projection onto said light-sensitive material while the light-sensitive material is so displaced to produce photographs from which the measurements are taken.

9. In the method of tailoring in which the subject for whom a garment is to be made is photographed and the photographs are used for taking measurements for the construction of the garment; the improvement which comprises positioning the subject to be photographed with respect to indicia marks defining a common base line and vertical and mutually perpendicular planes of interest, said indicia marks intersecting said subject, when so positioned, throughout its height, locating a camera so that images of the top and broadside of the subject may simultaneously be reflected thereto, twice and simultaneously reflecting the top and broadside views of the subject along respective bent optical paths of equal length to said camera, simultaneously photographing with said camera said twice reflected top and broadside views to obtain corresponding images at precisely the same scale and with respect to said vertical planes and the intersection line thereof and said base line, measuring in the plane of the image of said top view with respect to the center of said object and the plane of interest of said broadside view to obtain any angular displacement with respect to the center of said subject and the plane of interest of said broadside view to obtain any angular displacement with respect to said base line of the center line of said broadside view from said plane of interest and with respect to the point of intersection of said planes to obtain the angular displacement of the plane of said broadside view from the plane of interest of said broadside view, and displacing angularly a plane light-sensitive material from a normal position about a horizontal axis coincident with the projected image of said base line to the same extent and in the same direction as the angular displacement of the center line of the image of said broadside view from said plane of interest of said broadside view and about a vertical axis coincident with the vertical intersection line of said planes of interest to the same extent and in the same direction as the angular displacement of the plane of said broadside view from the plane of interest to said broadside view to effectively position the image of said broadside view in its respective plane of interest and centrally of said vertical intersection line, and printing the images by projection onto said light-sensitive material while the light-sensitive material is so displaced to produce photographs from which the measurements are taken.

10. In the method of tailoring in which the subject for whom a garment is to be made is photographed and the photographs are used for taking measurements for the construction of the garment; the improvement which comprises positioning the subject to be photographed with respect to indicia marks defining a common base line and vertical and mutually perpendicular planes of interest, said indicia marks intersecting said subject, when so positioned, throughout its height, locating a camera so that images of the side, front, rear and top of the subject may simultaneously be reflected thereto, twice and simultaneously reflecting the side, front, rear and top views of the subject along respective bent optical paths of equal length to said camera, simultaneously photographing with said camera said twice reflected side, front, rear and top views to obtain corresponding images at precisely the same scale with respect to said vertical planes and the intersection line of said vertical planes, the images of said side, front and rear views arranged along said common base line, measuring in the plane of the image of one view with respect to the point of intersection of said intersection line and said common base line to obtain any angular displacement of the center line of said one view from said intersection line, and displacing angularly a plane light-sensitive material about a horizontal axis coincident with the projected image of said common base line to the same extent and in the same direction as the angular displacement between the center line of said one view and said intersection line to effectively position the image of any other view in its respective plane of interest and centrally of said intersection line, and printing the images by projection onto said light-sensitive material while the light-sensitive material is so displaced to produce photographs from which the measurements are taken.

FRED WALLER.

References Cited in the file of this patent

UNITED STATES PATENTS

| Number | Name | Date |
|---|---|---|
| 647,608 | Pietzner | Apr. 17, 1900 |
| 865,418 | Moe | Sept. 10, 1907 |
| 1,331,978 | Brock | Feb. 24, 1920 |
| 1,418,602 | Moe | June 6, 1922 |
| 1,427,615 | Merriam | Aug. 29, 1922 |
| 1,565,413 | Brock | Dec. 15, 1925 |
| 1,612,800 | Brock | Jan. 4, 1927 |
| 1,654,070 | Corlett | Dec. 27, 1927 |
| 1,853,072 | Morioko | Apr. 12, 1932 |
| 1,906,509 | Aschenbrenner | May 2, 1933 |
| 1,937,433 | Moe | Nov. 28, 1933 |
| 1,980,981 | Cooke | Nov. 20, 1934 |
| 2,006,774 | Ohlsson | July 2, 1935 |
| 2,072,084 | Carey | Mar. 2, 1937 |
| 2,147,434 | Gallaher | Feb. 14, 1939 |
| 2,223,849 | Folger | Dec. 3, 1940 |
| 2,386,276 | Simjian | Oct. 9, 1945 |
| 2,563,451 | Booth | Apr. 7, 1951 |

OTHER REFERENCES

Carden Process of Photosculpture, Scientific American, vol. 102, May 14, 1910, pages 393 and 394.

Mottelay, Scientific American, vol. 106, June 1, 1912, pages 496 and 497.